US009311923B2

(12) United States Patent
Radhakrishnan et al.

(10) Patent No.: US 9,311,923 B2
(45) Date of Patent: Apr. 12, 2016

(54) ADAPTIVE AUDIO PROCESSING BASED ON FORENSIC DETECTION OF MEDIA PROCESSING HISTORY

(75) Inventors: Regunathan Radhakrishnan, Foster City, CA (US); Sevinc Bayram, Brooklyn, NY (US); Jeffrey Riedmiller, Penngrove, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 124 days.

(21) Appl. No.: 14/117,576

(22) PCT Filed: May 15, 2012

(86) PCT No.: PCT/US2012/037966
§ 371 (c)(1), (2), (4) Date: Nov. 13, 2013

(87) PCT Pub. No.: WO2012/158705
PCT Pub. Date: Nov. 22, 2012

(65) Prior Publication Data

US 2014/0336800 A1 Nov. 13, 2014

Related U.S. Application Data

(60) Provisional application No. 61/488,117, filed on May 19, 2011.

(51) Int. Cl.
*G06F 17/00* (2006.01)
*G10L 19/018* (2013.01)
(Continued)

(52) U.S. Cl.
CPC ............... *G10L 19/018* (2013.01); *G10L 25/06* (2013.01); *H04S 5/005* (2013.01); *G10L 19/008* (2013.01); *H04S 3/02* (2013.01); *H04S 2400/01* (2013.01)

(58) Field of Classification Search
CPC ..... G10L 19/008; G10L 19/018; G10L 25/06; H04S 3/02; H04S 5/005; H04S 2400/01
USPC .......................................................... 700/94
See application file for complete search history.

(56) References Cited

U.S. PATENT DOCUMENTS 5,812,971 A * 9/1998 Herre ............................ 704/230
6,694,027 B1 * 2/2004 Schneider ....................... 381/20
(Continued)

FOREIGN PATENT DOCUMENTS

WO 99/08425 2/1999
WO 2012/075246 6/2012

OTHER PUBLICATIONS

Herre, J., "MPEG-4 High-Efficiency AAC Coding [Standards in a Nutshell," IEEE Signal Processing Magazine, vol. 25, Issue 3, May 8, 2008.

(Continued)

*Primary Examiner* — Paul McCord

(57) ABSTRACT

A media signal is accessed, which has been generated with one or more first processing operations. The media signal includes one or more sets of artifacts, which respectively result from the one or more processing operations. One or more features are extracted from the accessed media signal. The extracted features each respectively correspond to the one or more artifact sets. Based on the extracted features, a conditional probability score and/or a heuristically based score is computed, which relates to the one or more first processing operations.

11 Claims, 8 Drawing Sheets

Example framework for audio forensics 200

(51) Int. Cl.

| | |
|---|---|
| ***G10L 25/06*** | (2013.01) |
| ***H04S 5/00*** | (2006.01) |
| *G10L 19/008* | (2013.01) |
| *H04S 3/02* | (2006.01) |

(56) References Cited

U.S. PATENT DOCUMENTS

| | | | | |
|---|---|---|---|---|
| 7,243,061 | B2 * | 7/2007 | Norimatsu et al. | 704/205 |
| 7,318,023 | B2 * | 1/2008 | Baum | 704/206 |
| 7,536,302 | B2 * | 5/2009 | Chen et al. | 704/230 |
| 8,280,538 | B2 * | 10/2012 | Kim et al. | 700/94 |
| 2003/0016755 | A1 * | 1/2003 | Tahara et al. | 375/240.25 |
| 2005/0243168 | A1 * | 11/2005 | Cutler | 348/14.12 |
| 2007/0236858 | A1 * | 10/2007 | Disch et al. | 361/272 |
| 2009/0125313 | A1 * | 5/2009 | Hellmuth et al. | 704/501 |
| 2010/0241433 | A1 * | 9/2010 | Herre et al. | 704/500 |

OTHER PUBLICATIONS

Moehrs, S. et al, "Analysing Decompressed Audio with the "Inverse Decoder"—Towards an Operative Algorithm," AES 112th Convention, May 10, 2002.

* cited by examiner

Example Generation of Left/Right Downmix 400

Example passive decoder - upmixer 500

ADAPTIVE AUDIO PROCESSING BASED ON FORENSIC DETECTION OF MEDIA PROCESSING HISTORY

CROSS-REFERENCE TO RELATED APPLICATIONS

This application claims priority to U.S. Provisional Patent Application Ser. No. 61/488,117 filed 19 May 2011, which is hereby incorporated in its entirety.

TECHNOLOGY

The present invention relates generally to signal processing. More particularly, an embodiment of the present invention relates to adaptive audio processing based on forensic detection of media processing history.

BACKGROUND

Media content typically comprises audio and/or image (e.g., video, cinema) information. Audio signals representative of media content, such as a stream of broadcast music, voice and/or sound effects, an audio portion of digital versatile disk (DVD) or BluRay Disk (BD) video content, a movie soundtrack or the like are accessed and processed. How loudspeakers, headphones or other transducers render the audio portions of the media content is typically based, at least in part, on the processing that is performed over the accessed audio signals. The processing that is performed on an accessed audio signal may have a variety of individual types, forms and characteristics, each having an independent purpose. Moreover, the various types and forms of processing that is performed on an accessed audio signal may be disposed or distributed over multiple processing entities, which may be included within a overall sound reproduction system.

For example, a sound reproduction system may include a set-top box, a tuner or receiver, a television (TV), stereo, or multi-channel acoustically spatialized home theater system, and one or more loudspeakers (and/or connections for headphones or the like, e.g., for individual listening). The set-top box accesses an audio signal from a cable, satellite, terrestrial broadcast, telephone line, or fiber optic source, or over a media interface such as high definition media interface (HDMI), digital video interface (DVI) or the like from a DVD or BD player. Processing of one kind may commence on the accessed audio signal within the set-top box. The processed signal may then be supplied to a TV receiver/tuner. Further processing of the audio signal may occur in the receiver. The receiver may then supply the signal to a TV, which may process the signal even further, and then render the processed signal with internal or external loudspeakers.

Processing of various types, forms and characteristics may be performed by the individual components on an audio system to achieve different results over the signal. For example, an audio processing application may relate to leveling the amplitude of the signal over sudden, gross changes. The audio signal amplitude of a broadcast may rise from a pleasant level, which may be associated with musical content or dramatic or educational dialog, to an unpleasant exaggerated boost level, to increase the marketing impact of a commercial segment. As the audio application senses the sudden level increase, it performs processing on the signal to restore the original volume level. However, if the same level processing operation is repeated subsequently by another audio system component over the already level-processed signal, then undesirable, conflicting, or counterproductive effects may result.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
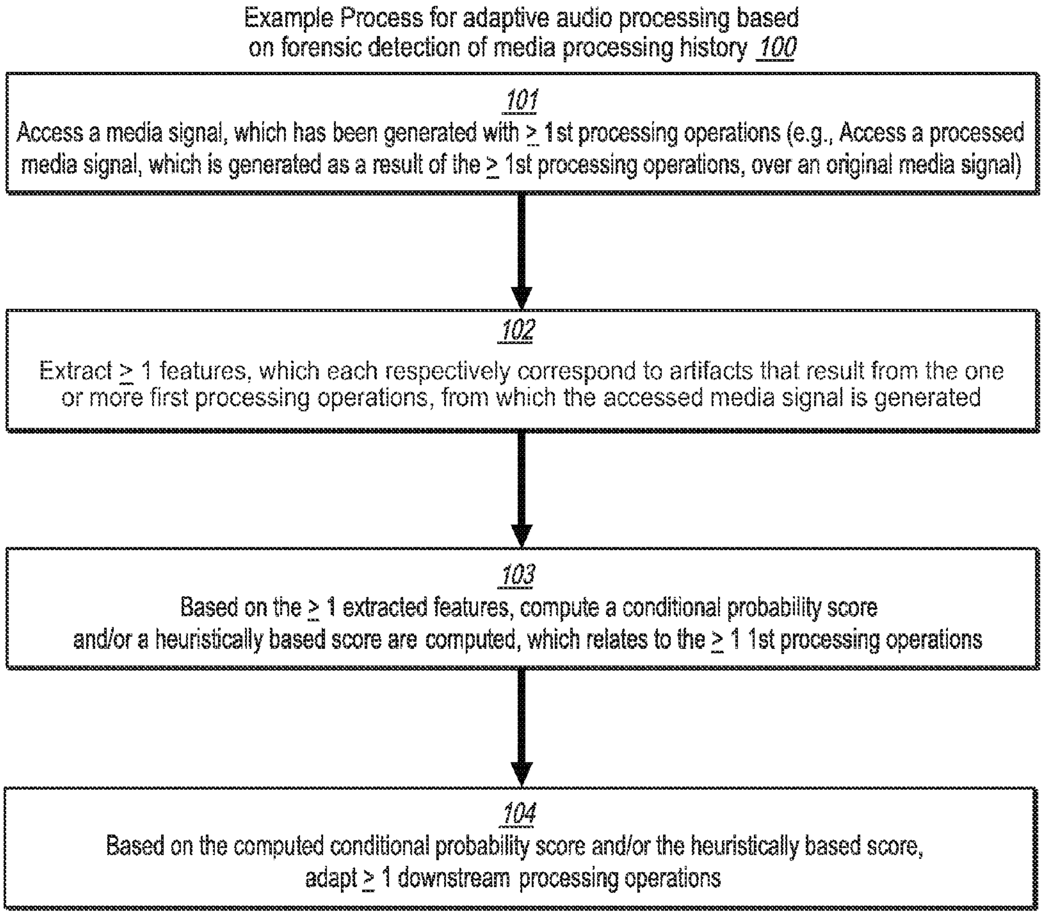
FIG. 1A depicts a flowchart for an example process, according to an embodiment of the present invention.

Adaptive audio processing based on forensic detection of media processing history is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to adaptive audio processing based on forensic detection of media processing history. An embodiment accesses a media signal, which has been generated with one or more first processing operations. The media signal comprises one or more sets of traces or unintended artifacts, which respectively result from the one or more processing operations. One or more features are extracted from the accessed media signal. The extracted features each respectively correspond to the one or more artifact sets. Based on the extracted features, a score is computed, e.g., blindly. In an embodiment, the score that is computed comprises a conditional probability. In an additional or alternative embodiment, the score is computed based on a heuristic. The heuristic or conditional probability score that is computed relates to the one or more first processing operations. A subsequent, e.g., temporally downstream processing operation may be adapted, based on the value computed for the conditional probability or heuristic score. An additional or alternative embodiment may also adapt a prior, e.g., temporally upstream processing operation, such as to provide feedback thereto.

As described herein, the media signal that has been generated with one or more first processing operations may relate or refer to a processed original media signal, in which the one or more processing operations each change at least one characteristic of the original signal to thus create the generated signal.

As used herein, the terms "trace" or "artifact" relates or refers to signs, hints, or other evidence within a signal, which has been added to the signal unintentionally and essentially exclusively by operation of a target or other signal processing function. Importantly, the terms trace and artifact are not to be confused or conflated with electronic, e.g., digital "watermarks." In contrast to the traces or artifacts referred to herein, watermarks are added to signals intentionally. Watermarks are intentionally added to signals typically, so as not to be readily detectable without temporally subsequent and spatially downstream watermark detection processing, which may be used to deter and/or detect content piracy. Again, as used herein, the terms "trace" or "artifact" relates or refers to signs, hints, or other evidence within a signal, which has been added to the signal unintentionally and essentially exclusively by operation of a target or other signal processing function.

Where a signal associated with media content may include hidden information such as a watermark and/or metadata, either of which relates to or describes aspects of a processing history of the media signal, an embodiment may function to use the hidden information or metadata to determine the processing history aspects. However, embodiments are well suited to blindly ascertain aspects of a signal's processing history using forensic detection of processing artifacts, e.g., without requiring the use of hidden information or metadata.

An embodiment adapts a downstream processing operation, which substantially matches at least one of the one or more first processing operations, upon computing a high value of the conditional probability. In an embodiment, the conditional probability computation is based, at least in part, on one or more off-line training sets, which respectively model probability values that correspond to each of the one or more first post-processing applications. An additional or alternative embodiment may also adapt a prior, e.g., temporally upstream processing operation, such as to provide feedback thereto.

Thus, an embodiment functions to adaptively process a media signal blindly, based on the state of the media, in which the media state is determined by forensic analysis of features that are derived from the media. The derived features characterize a set of artifacts, which may be introduced by certain signal processing operations on media content, which essentially comprises a payload of the signal. The forensic analysis of features thus comprises the conditional probability value computation relating to the extracted features under a statistical model.

Information relating to a processing history, e.g., a record, evidence, or artifacts of signal processing operations that have been performed over the media content, which may comprise a component thereof, or characterize a state that may be associated with the media, e.g., a media state. The information relating to the media processing history may indicate whether certain signal processing operations were performed, such as volume leveling, compression, upmixing, spectral bandwidth extension and/or spatial virtualization, for example.

An embodiment obtains the statistical model with a training process, using an offline training set. The offline training set may comprise both: (1) example audio clips that undergone (e.g., been subjected to) certain processing operations, e.g., upmixing, compression, (2) example audio clips that have not undergone those certain processing functions. The example audio clips that undergone the certain processing operations may be referred to herein as example positive audio clips. In contrast, the example audio clips that have not undergone the certain processing operations may be referred to herein as example negative audio clips.

An embodiment adaptively processes the audio signal based on the state of the media to, for example: (a) adjust certain parameters, or (b) adapt a mode of operation (e.g., turning off or on, boosting or bucking, promoting or deterring, delaying, restraining, constraining, stopping or preventing) certain processing blocks, e.g., activities, functions or operations.

An example embodiment relates to forensically detecting an upmixing processing function performed over the media content or audio signal. For instance, an embodiment detects whether an upmixing operation was performed, e.g., to derive individual channels in a multi-channel content, e.g., an audio file, based on forensic detection of relationship between at least a pair of channels.

The relationship between the pair of channels may include, for instance, a time delay between the two channels and/or a filtering operation performed over a reference channel, which derives one of multiple observable channels in the multichannel content. The time delay between two channels may be estimated with computation of a correlation of signals in both of the channels. The filtering operation may be detected based, at least in part, on estimating a reference channel for one of the channels, extracting features based on correlation of the reference channel and the observed channel, and computing a score of the extracted features based, as with one or more other embodiments, on a statistical learning model, such as a Gaussian Mixture Model (GMM), Adaboost or a Support Vector Machine (SVM).

The reference channel may be either a filtered version of one of the channels or a filtered version of a linear combination of at least two channels. In an additional or alternative embodiment, the reference channel may have another characteristic. As in one or more embodiments, the statistical learning model may be computed based on an offline training set.

Example Process

An embodiment relates to a process for adaptive audio processing based on forensic detection of media processing history. FIG. 1A depicts a flowchart for an example process 100 for adaptive audio processing based on forensic detection of media processing history, according to an embodiment of the present invention.

In step 101, a media signal is accessed, which has been generated with one or more first processing operations. In an example embodiment, a processed media signal may be accessed, in which the processed media signal is generated as a result of the one or more first processing operations, functioning over an original media signal. An embodiment processes the media signal adaptively according to the state of the media.

Figure 1B:
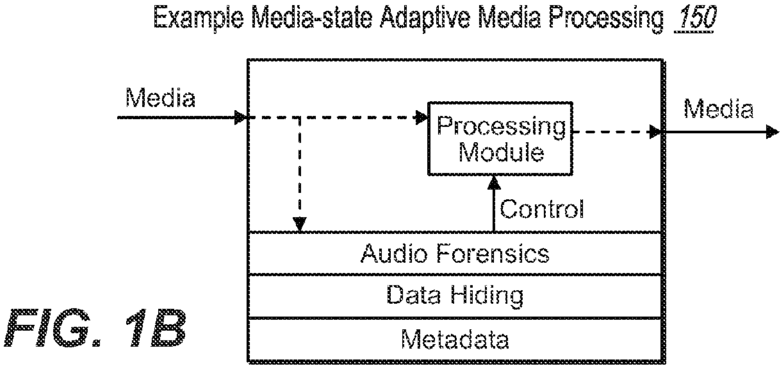
FIG. 1B depicts an example of media-state adaptive media processing, according to an embodiment of the present invention.

In an embodiment, the state of the media signal, which may relate to the current state, e.g., as affected with one or more previously performed media processing functions. As used herein, the term media state may relate to the current state of the media signal during its processing history, wherein the processing history relates to the one or more media processing functions that were performed previously over the media signal. FIG. 1B depicts an example of media-state adaptive media processing 150, according to an embodiment of the present invention.

As depicted in FIG. 1B, an embodiment may determine the state of the media using metadata and/or hidden data, which may comprise a portion of the media signal. Where the media state is determined using metadata and/or hidden data in the media signal, forensic detection may be obviated and an embodiment may refrain from performing the forensic steps described below, which may conserve computational resources and/or reduce latency. If however the media signal lacks such metadata or hidden information, an embodiment functions to extract features from the media signal, such as artifacts or other signal characteristics, which may characterize, and thus be used for forensic detection of the media state and its related processing history. A description of example embodiments continues below, with reference again to FIG. 1A.

In step 102, one or more features are extracted from the accessed or processed media signal. Each of the one or more features respectively correspond to artifacts that result from the one or more first processing operations, from which the accessed media signal is generated.

In step 103, a score is computed, which relates to the one or more first processing operations. The score that relates to the one or more first processing operations is computed based on the one or more features, which are extracted from the accessed or processed media signal. In an embodiment, the score that is computed comprises a conditional probability. In an additional or alternative embodiment, the score is computed based on a heuristic.

For example, during upmixing operations, there may be a time-delay, e.g., of 10 ms introduced between front and surround channels. An embodiment uses a simple heuristic to detect whether a given piece of multi-channel content is a result of an upmixing operation, e.g., whether that upmixing function comprises a feature of the multi-channel content's processing history. In an embodiment, the heuristic seeks a time-alignment, which may exist between front and surround channels based, e.g., on correlation of front and surround channel signals. The measured time alignment is compared to the expected (example) time delay of 10 ms. If the difference between the measured time alignment and the expected time delay is below certain threshold, then an embodiment infers that the observed multi-channel content is a result of upmixing operation. Corresponding downstream action may then be taken, based on the inference. An additional or alternative embodiment may also adapt a prior, e.g., temporally upstream processing operation, such as to provide feedback thereto. Alternatively or additionally, the score could be based on a conditional probability from a statistical learning model. The statistical learning model uses an off-line training set and combines multiple forensic cues with appropriate weights. While the embodiments are described below with reference to an example conditional probability, the description is not meant to limit embodiments thereto. On the contrary, embodiments of the present invention are also well suited to function with a score that is computed based on a heuristic, or with a score that thus comprises a combination of a first conditional probability based score and a second heuristically based score.

Thus, process 100 for adaptive audio processing based on forensic detection of media processing history essentially analyzes the media signal to effectively ascertain information that relates to the state of the media. Process 100 may effectively ascertain the media state information in an embodiment without requiring metadata or side information relating to the media state.

In step 104, one or more downstream signal processing operations are adapted, based on the computed conditional probability. For example, if the conditional probability that a volume leveling operation, a spectral bandwidth operation, and/or an upmixing operation has been performed over the accessed audio signal (e.g., within its processing history) is computed to have a high value, then the subsequent performance of a signal processing operation that substantially conforms to, corresponds to or essentially duplicates one or more of those previously performed signal processing operations may be restrained, constrained, deterred, limited, curtailed, delayed, prevented, stopped, impeded or modified based on the high conditional probability value that is computed. Process 100 thus further functions to provide adaptive processing based on the state of the media. An additional or alternative embodiment may also adapt a prior, e.g., temporally upstream processing operation, such as to provide feedback thereto.

In executing its forensic detection function, process 100 detects blindly whether certain signal processing operations have been performed on a piece of audio content, e.g., without using any side information or metadata. Signal processing operations that run over audio media may leave a trace or an artifact in the content. In a sense that may be familiar to artisans skilled in fields that relate to audio processing, the artifacts or traces that may be left or imposed in the media content may be considered similar to an essentially unintended electronic or digital watermark on the content. For instance, a certain first signal processing operation may leave an artifact of a first kind and another, e.g., second signal processing operation may leave an artifact of a second kind. One or more characteristics of the first artifact may differ from one or more characteristics of the second artifact. Thus, the first and the second artifacts, and/or more generally, artifacts left by various, different signal processing operations, are detectably and/or identifiably unique in relation to each other. Thus, to detect that a particular type of signal processing has been performed over media content, the audio forensic tool functions to try to detect, identify and/or classify the traces or artifacts that characterize that aspect of the content processing history uniquely.

For instance, an audio signal may have in its processing history a loudness leveling operation, such as one or more functions of the Dolby Volume™ application. Such loudness leveling processing may adjust gains around an audio scene boundary, e.g., as the loudness leveling application attempts to maintain loudness levels across audio scene boundaries. Thus, an example embodiment analyzes certain audio features at scene boundaries, in order to possibly detect blindly whether Dolby Volume™ or other loudness leveling processing has been performed on the audio content. Devices, apparatus or systems downstream, e.g., temporally subsequent in the entertainment chain (e.g., the audio signal or content processing sequence) that subsequently handle the same processed (e.g., loudness-leveled) audio content may bypass additional Dolby Volume processing. The devices, etc. may thus economize on computational resources and/or eliminate, prevent, impede or deter further artifact formation, which may occur due to subsequent or cascaded signal processing functions that relate to loudness leveling. An additional or alternative embodiment may also adapt a prior, e.g., temporally upstream processing operation, such as to provide feedback thereto.

Blind detection of coding artifacts, which may occur during, or as a result of audio compression comprises another example audio forensic application. Blind detection that a particular audio stream has been compressed, earlier in its processing history, e.g., with an AC-3 (e.g., Dolby Digital™) encoder, implies that retrieval of certain useful metadata may be helpful in re-encoding the same clip a subsequent time, or encoding a subsequent instance of the same audio clip. Embodiments allow the state of the audio clip to be ascertained or determined at any point in the entertainment chain or processing history. Thus, an embodiment may help guide the choice and mode of operation of subsequent audio processing tools temporally downstream, which promotes efficiency and computational economy and/or reduces latency. An additional or alternative embodiment may also adapt a prior, e.g., temporally upstream processing operation, such as to provide feedback thereto.

An embodiment thus relates to analysis tools, which are developed to handle certain forensic tasks that could be helpful in determining the current state of media content such as an audio stream without the help of metadata or side information. Such audio state information enables audio processing tools, e.g., downstream of the forensic analysis tools, to function with an intelligent mode of operation. In an embodiment, such forensic analysis tools are helpful in assessing the quality of an audio signal under test. An additional or alternative embodiment may also adapt a prior, e.g., temporally upstream processing operation, such as to provide feedback thereto.

Example Framework

Figure 2:
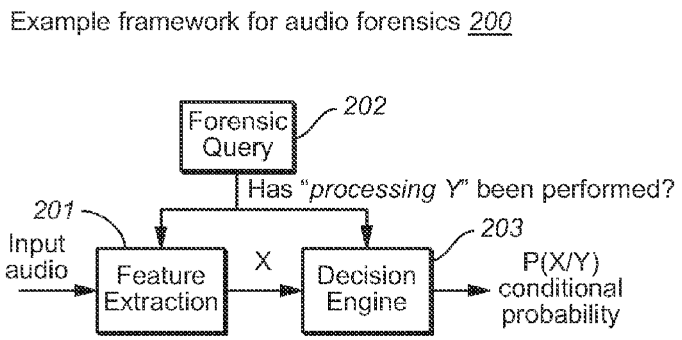
FIG. 2 depicts example audio forensic framework, according to an embodiment of the present invention.

An embodiment relates to a system, apparatus or device, which may be represented by a framework for adaptive audio processing based on forensic detection of media processing history. FIG. 2 depicts example audio forensic framework 200, according to an embodiment of the present invention. An example forensic task to be performed with framework 200 may be to detect whether a certain processing operation 'Y' (e.g., one or more signal processing functions) has been performed on an input audio clip (e.g., stream, sequence, segment, content portion, etc.). Example audio forensic framework 200 has a feature extraction module (e.g., feature extractor) 201, which extracts features (X) from the input audio clip. In an embodiment, audio forensic framework 200 may comprise a feature, component, module or functional characteristic of the example media-state adaptive media processing module 150 (FIG. 1B).

The type of features that feature extractor 201 extracts from the input audio stream depends on the forensic query that is set forth or executed with forensic query module 202, for which the example framework 200 is programmed, configured or designed to handle. For instance, features that may be used to detect loudness level (e.g., Dolby Volume) processing may differ in one or more significant aspects from other features, which may be used to detect compression coding, such as AC-3 (e.g., Dolby Digital™) or another signal processing function.

Based on the extracted features X, a decision engine 203 computes a conditional probability value. The conditional probability relates to the likelihood of observing the extracted features (X), given that the certain processing functions Y has been performed on the input audio clip earlier. In an embodiment, decision engine 203 computes the conditional probability that the certain processing functions Y have been performed on the input audio signal, based on detection of the features that are extracted therefrom.

Example Conditional Probability Computation Process

Figure 3:
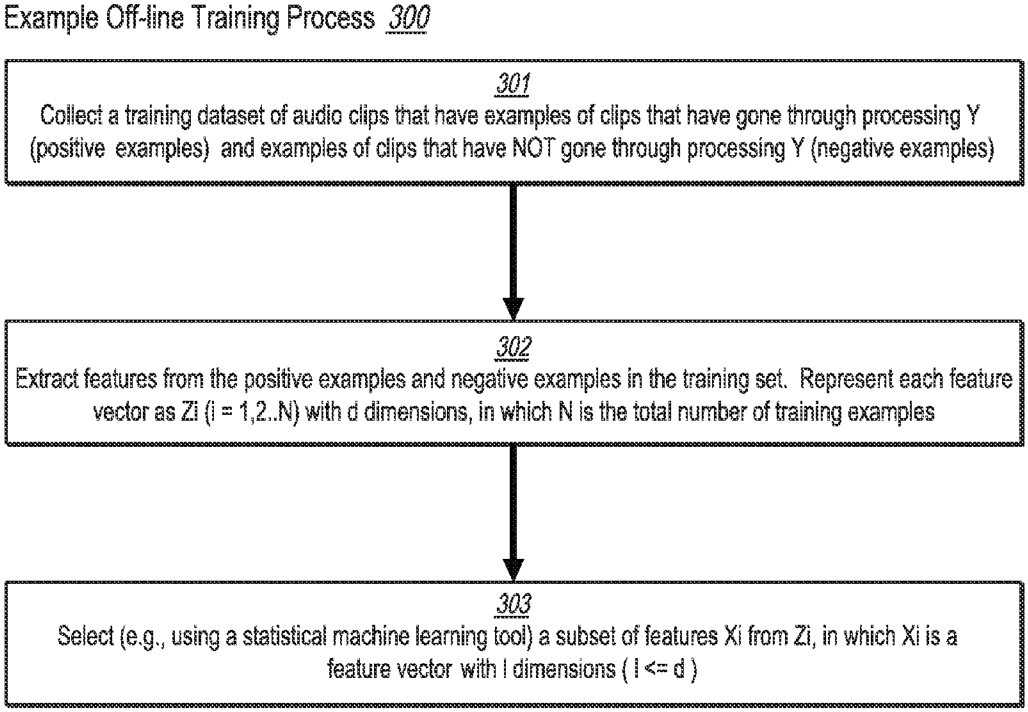
FIG. 3 depicts a flowchart for an example process for computing a conditional probability of observing particular extracted features, given that certain processing functions are detected, according to an embodiment of the present invention.

FIG. 3 depicts a flowchart for an example process 300 for computing a conditional probability of observing the extracted features (X), given that the certain processing functions Y, according to an embodiment of the present invention. In step 301, a training dataset of audio clips is collected. The training set that is collected has examples of audio clips that have undergone processing functions Y. As used herein, the term, "positive example" may relate or refer to an example audio clip that has undergone the target processing functions. The training set also has examples of audio clips that have not undergone processing functions Y. As used herein, the term, "negative example" may relate or refer to an example audio clip that has not undergone the target processing functions.

In step 302, example features are extracted from the positive examples and negative examples in the training set. Each feature vector is represent as Zi (i=1, 2 . . . N) with d dimensions. The number N represents the total number of training examples. Each feature vector Zi in the training set has an associated label Li {either 0 or 1} indicating whether Zi is a positive example (1) or a negative example (0).

In step 303, a statistical machine learning tool is used, which selects a subset of features Xi from the vector Zi. Here Xi represents a feature vector with l dimensions, in which l is less than or equal to the number d of dimensions (l≤d). The statistical learning tool outputs a function Fy, which maps each of the features Xi such that the probability $$P(Fy(Xi)=Li/Xi)$$

is maximized. Embodiments may be implemented with a variety of statistical machine learning tools, including for example (but by no means limitation) a Gaussian Mixture Model (GMM), a Support Vector Machine (SVM) or Adaboost.

Example Applications

Embodiments may use different forensic queries to detect various signal processing tasks (Y) that may have been performed, e.g., during its processing history, on audio content. Upon determining, with a forensic tool, whether certain specific processing has been performed on the audio content, a post-processing or subsequent signal processing function can adapt its mode of operation.

A. Example Detector for Loudness Leveling Processing Functions.

As described above detecting whether a loudness (volume) leveling processing function such as Dolby Volume been performed previously on a piece of audio content can help avoid, restrain, prevent, constrain or control additional volume leveling processing in devices that may subsequently handle the same audio clip, e.g., temporally downstream in an entertainment chain. Dolby Volume™ and similar volume leveling processing functions typically adjusts gains around a scene boundary, as the application functions to maintain loudness levels across audio scene boundaries. Thus, an embodiment analyzes certain audio features at scene boundaries to blindly detect whether volume leveling processing has been performed already, previously in the audio file's processing history. An additional or alternative embodiment may also adapt a prior, e.g., temporally upstream processing operation, such as to provide feedback thereto.

B. Detector for Spectral Bandwidth Replication.

Spectral Bandwidth Replication (SBR) comprises a process for blind bandwidth extension, which is used in some high performance audio codecs such as HE-AAC. SBR and related blind bandwidth extension techniques use information from lower audio frequency bands to predict missing high frequency audio information. Thus, SBR artificially extends the bandwidth of an input audio signal. An embodiment functions to detect whether blind bandwidth extension has been performed within the processing history of an audio stream. An embodiment thus allows an audio coder to function more efficiently and economically, encoding only the lower frequency band information and generating the higher frequency band information using SBR. An embodiment also functions to deter or prevent a downstream device, which attempts subsequent SBR processing on the same audio stream, from extending the bandwidth using information from parts of the spectrum that are already results of a previous bandwidth extension process. An additional or alternative embodiment may also adapt a prior, e.g., temporally upstream processing operation, such as to provide feedback thereto.

C. Detector for Perceptual Audio Coding (Compression), Surround Channel Phase Shifts and Dyanamic Range Compression Profiles (Aesthetics).

An embodiment detects whether AC-3 (Dolby Digital™) or other types of compression have been performed during the processing history of an audio stream, which can be useful for audio encoders. Some codecs including AC-3 add metadata to an audio stream. The metadata comprises information that is relevant to the encoding process used in compressing the audio. An embodiment functions to retrieve and reuse certain metadata, which may be helpful in subsequent encoding of the same clip. Some codecs including AC-3 use certain settings, such as filter taps or phase shifts. An embodiment functions to forensically detect certain settings that were used during a previous encoding activity, which occurred earlier in the audio stream processing history. Detecting such information improves the efficiency and economic function of an encoder. For instance, upon detecting forensically that a phase shift of 90-degrees was performed on the surround channels during a previous encoding operation, the phase-shift operation may be obviated, avoided or skipped by a subsequent encoder.

Some advanced audio codecs allow encoding of certain dynamic range compression (e.g., aesthetic, artistic) profiles with the content. For example, AC-3 provides a dynamic range compression (DRC) profile. An embodiment functions to detect whether an artistic DRC profile was used during the previous encoding, and what features the DRC profile includes. For example, the DRC profiles of AC-3 include Film Lite™ and Music Lite.™ As it is desirable to use the same DRC profile for subsequent encodings of the same audio clip, an embodiment functions to detect forensically the DRC profile, and then to preset that profile for subsequent use on the same audio stream.

D. Detector for Spatial Virtualization.

An embodiment detects forensically whether an input sound clip has been spatially virtualized for use with speaker virtualizers, upmixers and/or binaural renderers. For example, upon detecting that the input audio clip has been prepared for binaural rendering within its processing history, to render the same clip through loud speakers, an application downstream in the audio processing chain may use cross-talk cancellation. An additional or alternative embodiment may also adapt a prior, e.g., temporally upstream processing operation, such as to provide feedback thereto.

E. Detector for Upmixing and/or Downmixing.

A blind audio upmixer generates N channels of output from a piece of stereo/mono audio content (e.g., mono/stereo upmixed to 5.1 or 7.1 Surround). An embodiment forensically detects whether a piece of stereo or monophonic audio content has been upmixed and downmixed already. Such information in relation to the audio clip's processing history can be useful for a blind upmixer. For example, the blind upmixer may use a different, more efficient strategy, or one which conserves computational resources, based on the detected forensic information that the stereo/mono input has already been upmixed and downmixed before. Similarly, an embodiment forensically detects whether a piece of multiple-channel (e.g., 5.1, 7.1) surround results from a previous upmixing. An example of forensic upmixing detection, according to an embodiment, is described in more detail, below.

Example Forensic Upmixing/Downmixing Detector Application

An example embodiment detects forensically a variety (including specific) up-mixing signal processing operations that may be performed over a number N (e.g., a positive whole number) of audio channels. A set of cues may be sought that are helpful in detecting one or more specific upmixers. A first example embodiment functions to detect a specific upmixer, e.g., an upmixer that performs substantially like the Dolby Prologic™ Upmixer. The first example embodiment seeks forensically a set of cues, which allow it to detect that one or more Prologic™ Upmixers have performed a function within the processing history of an audio clip. A second example embodiment functions to detect one or more functions performed over an audio clip by a broadcast upmixer application, such as Dolby Broadcast Upmixer.™ The second example embodiment seeks forensically a set of cues, which allow it to detect that one or more broadcast upmixers have performed a function within the processing history of an audio clip. The first example embodiment is described with reference to the Dolby Prologic (I)™ Upmixer. Embodiments may function with a variety of upmixers; the Dolby Prologic (I)™ Upmixer is used herein as a descriptive, but non-limiting example.

Figure 4:
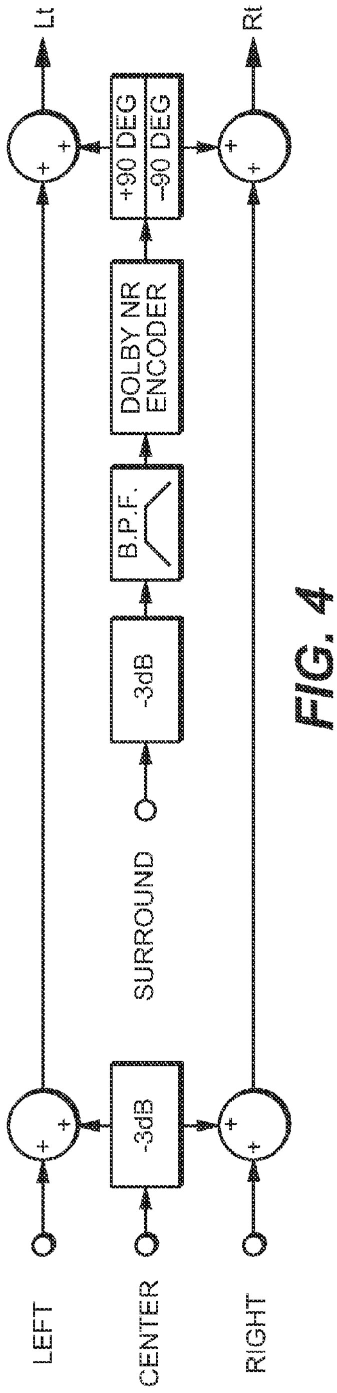
FIG. 4 depicts an example left/right Downmix operation, which an embodiment of the present invention may detect forensically.

FIG. 4 depicts an example left/right Downmix operation 400, which an embodiment of the present invention may detect forensically. The Dolby Prologic (I) Upmixer™ Upmixer decodes up to four (4) channels of audio from a spatially encoded left/right (Lt/Rt) downmixed stereo file. The Lt/Rt downmixed stereo file may be generated by a spatial encoder that combines an in-phase mix of the front channels with an out-of-phase mix of the surround channels. The center channel information is split equally and added in-phase to the Left and Right channels, while the surround channel information in the Lt/Rt downmix is 180-degree out of phase with each other. The surround channel information is out-of-phase in the Lt/Rt Downmix; thus a Dolby Prologic upmixer decoder that computes (Lt+Rt) provides independent information in relation to the front channel, and computing (Lt−Rt) provides independent information in relation to the surround channel.

Figure 5:
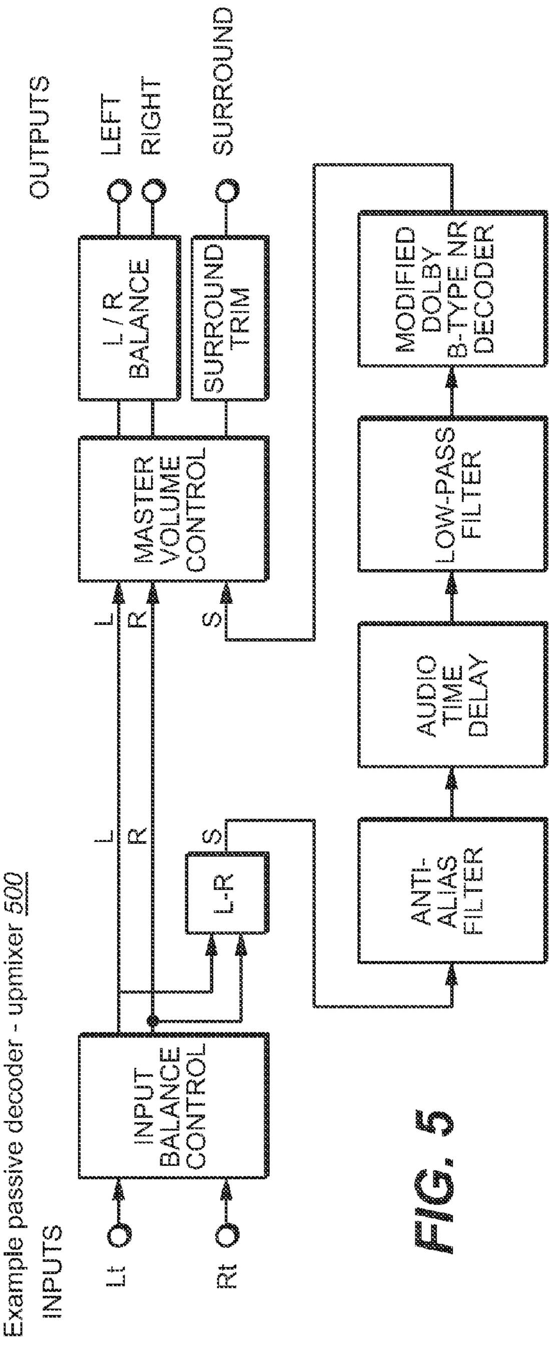
FIG. 5 depicts an example decoder that computes front-channel and surround-channel information, with which an embodiment of the present invention may function.

FIG. 5 depicts an example decoder 500 that computes front-channel and surround-channel information, with which an embodiment of the present invention may function. Decoders with which an example embodiment functions may be active or, as depicted in FIG. 5, passive. Active decoders may function much as the passive decoders, with some gains applied over the output channels: Left, Right, Center and Surrounds. The gains may be computed based on level differences between the Lt and Rt inputs, e.g., to determine Left or Right dominance, and the level differences between (Lt−Rt) and (Lt+Rt), e.g., to determine Front or Surround dominance. More specifically left, right and surround channels can be computed according to Equations 1, below.

$$L=G_{LL}Lt+G_{RL}Rt$$

$$R=G_{LR}Lt+G_{RR}Rt$$

$$Ls=Rs=G_{LS}Lt+G_{RS}Rt \quad (1)$$

In Equations 1, $G_{LL}$, $G_{RL}$, $G_{LR}$, $G_{RR}$, $G_{LS}$ and $G_{RS}$ represent the gains that are computed based on the level differences. Decoder 500 has a time delay block 501, a low-pass filter block 502 and a noise reduction block 503, which function over the surround channels.

Based on this decoder functionality, several cues may be sought forensically. Detecting the cues allows a determination of whether a given set of channels (L,R,C and Surrounds) were generated from decoding during the processing history of the audio clip. Detectable cues may include, for example, a time delay that exists between the surround channels and the left, right and center channels. The time delay can be estimated by correlating the (Ls/Rs) with (L/R/C). Time delay estimation works when the surround channels are active and have significant information. However, estimating time delays can be difficult if the surround channels are inactive or lack significant information. Detectable cues may also include, for example, an artifact of a filter function that may have operated over an audio clip. Thus for example, where a low-pass filter with a certain cut-off frequency has functioned over one or more of the original surround channels, the original surround channel information is expected to include significant information around that particular cut-off frequency. An embodiment is described in relation to these examples, below.

A. Example Time Delay Estimation Between Pairs of Upmixed Channels.

Figure 6:
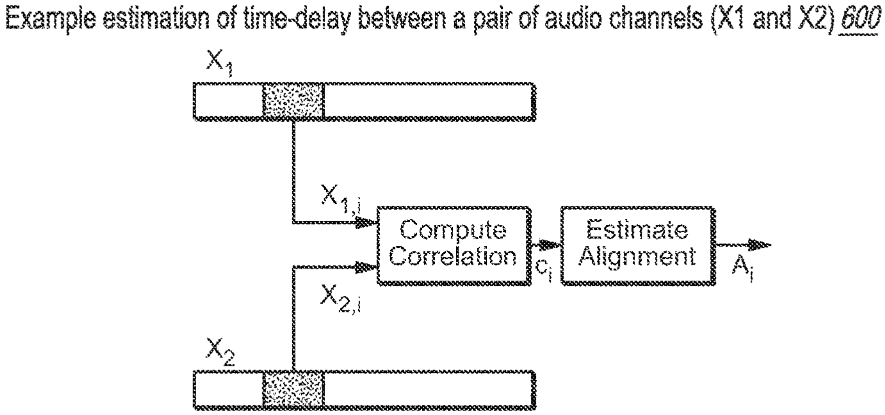
FIG. 6 depicts an example estimation of time-delay between a pair of audio channels, according to an embodiment of the present invention.

FIG. 6 depicts an example estimation 600 of time-delay between a pair of audio channels (X1 and X2), according to an embodiment of the present invention. X1 represents a Left/Right channel. X2 may represent Left Surround/Right Surround channel. Each of the signals X1 and X2 is divided into frames of a number N of audio samples. Each of the N frames is indexed as represented with ‘i’. Given the N audio samples from two signals that corresponding to the frame ‘i’, a correlation sequence Ci for different shifts (w’s) is computed according to Equation 2, below:

$$Ci(w)=\text{Sum}(X1,i(n)X2,i(n+w)) \quad (2)$$

In Equation 2, n varies from −N to +N and w varies from −N to +N in increments of 1. The time delay estimate Ai between X1,i and X2,i comprises the shift ‘w’, for which the correlation sequence has the maximum value; thus, Ai=argmax(Ci).

Using various modes of Dolby Pro Logic II™ decoder operation for example (not by way of limitation), delay offsets relative to L/R signals are shown in Table 1, below.

TABLE 1

| Decoder Mode | C Signal | Ls/Rs Signals | Lb/Rb or Cb Signals |
|---|---|---|---|
| Dolby Pro Logic | 0 | 10 | — |
| Dolby Pro Logic II Movie | 0 | 10 | — |
| Dolby Pro Logic IIx Movie | 0 | 10 | 20 |
| Dolby Pro Logic II Music | 2 | 0 | — |
| Dolby Pro Logic IIx Music | 2 | 0 | 10 |
| Dolby Pro Logic II Game | 0 | 10 | — |
| Dolby Pro Logic IIx Game | 0 | 10 | 20 |

An embodiment examines the time-delay between L/R and Ls/Rs for every frame of audio samples. If the most frequent estimated time delay value is 10 milliseconds (ms), then from Table 1, it is likely that the observed 5.1 channel content has been generated by Prologic or Prologic II in their respective Movie/Game modes. Similarly, if the most frequent estimated time delay value between L/R and C is 2 ms, then it is likely that the observed 5.1 channel content has been generated by Prologic II in its Music mode.

B. Example Low-Pass Filter Detection in Decoded Content.

An embodiment seeks evidence of operation of the low pass filter block 502 (FIG. 5) as a cue to detect a specific upmixing method. Information in relation to the operation of other filters (e.g., high-pass, band-pass, notch, etc.) may also be sought. The low-pass filter may change in different modes of a decoder operation, such as the music mode or the matrix mode of the Dolby Prologic (II)™ decoder.

For example, in the music and matrix mode, a shelf filter may be used, such as for removing a high frequency edge from an audio signal. In the emulation mode however, which is compatible with Dolby Prologic (I)™ decoder, a 7 kHz Butterworth low-pass filter is used. The Butterworth low-pass filter is used because, for a given azimuth error between the two audio channels, a leakage signal magnitude may increase with frequency, which could making separation at the high frequencies much more difficult to achieve. Thus, without the filter for example, dialogue sibilance could rise to a level sufficient to distract from the surround channel effects. Moreover, reducing high-frequency content may allow sound from surround speakers to be perceived as apparently more distant and more difficult to localize. These characteristics may benefit an audio perception experience for a person seated close to the surround speakers.

Figure 7A:
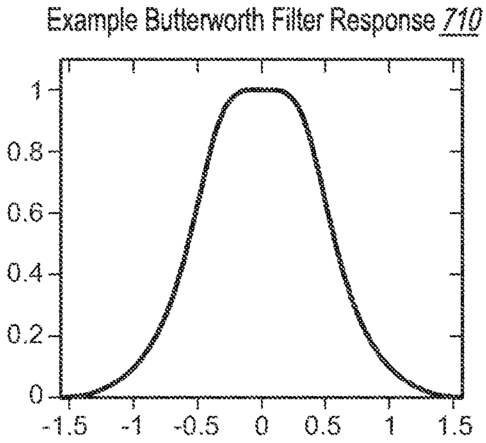
FIG. 7A and FIG. 7B respectively depict an example frequency response of a Butterworth filter and an example frequency response of a shelf filter, with which an embodiment of the present invention may function.
Figure 7B:
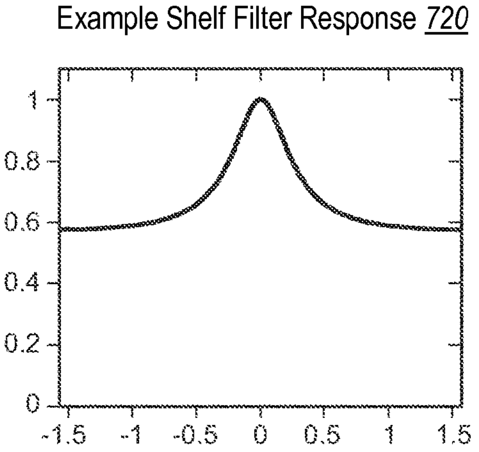

FIG. 7A and FIG. 7B respectively depict an example frequency response 710 of a Butterworth filter and an example frequency response 720 of a shelf filter, with which an embodiment of the present invention may function. An embodiment detects whether audio content is a product of a certain upmixer, e.g., whether the processing history of the content includes one or more signal processing functions that characterize the upmixer. An embodiment is described below with reference to the Dolby Prologic (I) and (II)™ decoders. This reference is by way of example and is not to be construed as limiting. On the contrary; embodiments are well suited to function with a variety of decoders.

C. Example Detection Application for Decoders.

To detect whether an N channel of audio is a product of Prologic decoder, an embodiment seeks to detect whether a specific low-pass filter function was applied over the surround channels. As in Equation 1 above, left, right and surround channels are derived from the linear combination of the input Lt and Rt signals. Thus, the surround signals essentially comprise a linear combination of output left and right signals, as in Equation 3, below.

$$Ls=mL-nR \tag{3}$$

In Equation 3, $$m=(G_{LR}G_{RS}-G_{RR}G_{LS})/(G_{RL}G_{LR}-G_{LL}G_{RR})$$

and $$n=(G_{RL}G_{LS}-G_{LL}G_{RS})/(G_{RL}G_{LR}-G_{LL}G_{RR}).$$

In the time domain, it is assumed that m and n are approximately equal, m≈n. Thus, a high degree of correlation is expected: ρ(Ls, L−R)→high, in which p represents the correlation operation. If the surround channel signals have also been low pass filtered, then filtering L−R with the same coefficients should increase the correlation amount, as shown in Inequality 5, below.

$$\rho(Ls,LPF(L-R))>\rho(Ls,L-R) \tag{5}$$

In an embodiment, the first feature F1 sought is the difference between these two correlation values, as in Equation 6, below.

$$F1=\rho(Ls,LPF(L-R))-\rho(Ls,L-R) \tag{6}$$

The increase in the correlation is expected to be consistent for a fixed length of audio stream that was produced with a certain decoder, such as Prologic™ in the related modes. If another low-pass filter were to be used to generate the surround channels however, the difference between correlations, and thus the feature values sought are expected to differ. Embodiments may indeed use the correlation value itself as a forensic feature to be sought in detecting Prologic™ and/or other upmixers. An example embodiment seeks to detect filtering functions, which may comprise a portion of the processing history of the audio content. In filter function detection, the correlation value may go unused.

An embodiment may use a similar approach in the phase domain. For example, if:

$$\theta_{Ls}=\theta_{L-R}+\theta_{LPF},$$

then $$\rho(\theta_{Ls},\theta_{L-R}+\theta_{LPF})>\rho(\theta_{Ls},\theta_{L-R}).$$

A second feature may thus be defined according to Equation 7, below.

$$F2=\rho(\theta_{Ls},\theta_{L-R}+\theta_{LPF})-\rho(\theta_{Ls},\theta_{L-R}) \tag{7}$$

An embodiment seeks the additional filter functions as new features. For example, a filter (LPFi) may have cut-off frequency of 10 khz and the cut-off frequency of the filter (LPF), which an embodiment functions to detect is 7 khz. The frequency response of the target filter (LPF) is specified to be:

$$\begin{cases} |H_T^p(\omega)|e^{(j\theta_T^p(w))}, & 0<w<6000 \\ |H_T^t(\omega)|e^{(j\theta_T^t(w))}, & 6000<w<8000 \\ 0, & \text{elsewhere} \end{cases}$$

In the specified impulse response, $|H_T^p(\omega)|$ and $\theta_T^p(\omega)$ represent the magnitude and phase response of the target filter in its passband and $|H_T^t(\omega)|$ and $\theta_T^p(\omega)$ represent the magnitude and phase response of the target filter in its transition band.

The frequency response of the ith filter (LPFi) is specified to be:

$$\begin{cases} |H_i^{p1}(\omega)|e^{(j\theta_i^{p1}(w))}, & 0<w<6000 \\ |H_i^{p2}(\omega)|e^{(j\theta_i^{p2}(w))}, & 6000<w<8000 \\ |H_i^{p3}(\omega)|e^{(j\theta_i^{p3}(w))}, & 8000<w<9000 \\ |H_i^{t}(\omega)|e^{(j\theta_i^{t}(w))}, & 9000<w<11000 \\ 0, & \text{elsewhere} \end{cases}$$

LPFi comprises a low-pass filter with a cut-off frequency of 10000 Hz. The passband of this filter is split into three bands: p1(0<w<6000), p2(6000<w<8000), and p3 (8000<w<9000). In the frequency ranges where these two filters are both non-zero (p1 and p2), the frequency response of ith filter can be written as product of target filter and another filter, as shown below.

$$\begin{cases} |H_T^p(\omega)|e^{(j\theta_T^p(w))}\dfrac{|H_i^{p1}(w)|}{|H_T^p(w)|}e^{(j\theta_i^{p1}(w))}e^{-(j\theta_T^p(w))}, & 0<w<6000 \\ |H_T^t(\omega)|e^{(j\theta_T^t(w))}\dfrac{|H_i^{p2}(w)|}{|H_T^t(w)|}e^{(j\theta_i^{p2}(w))}e^{-(j\theta_T^t(w))}, & 6000<w<8000 \\ |H_i^{p3}(\omega)|e^{(j\theta_i^{p3}(w))}, & 8000<w<9000 \\ |H_i^{t}(\omega)|e^{(j\theta_i^{t}(w))}, & 9000<w<11000 \\ 0, & \text{elsewhere} \end{cases}$$

Thus, the 10 khz low-pass filter in the frequency range (0<w<6000) may comprise two components (a) and (b), shown below.

$$|H_T^p(\omega)|e^{(j\theta_T^p(w))} \tag{a}$$

and $$\frac{|H_i^{p1}(w)|}{|H_T^p(w)|}e^{(j\theta_i^{p1}(w))}e^{-(j\theta_T^p(w))} \tag{b}$$

Component (a) matches the target filter. Component (b) comprises a ratio of two magnitude responses in the pass-band.

Similarly, the response of 10 khz filter in the frequency range (6000<w<8000) has two components. One component of the 10 kHz filter response comprises a ratio of the magnitude response of filter 'i' in passband (p2) to the magnitude response of the target filter in the transition band. The ratio of the magnitude response of filter 'i' in passband (p2) to the magnitude response of the target filter in the transition band is expected to exceed one (>1). Thus, the energy of LPFi(L−R) in the frequency range (6000<w<8000) may exceed the energy of LPF(L−R). Further, the energy of LPFi(L−R) in the frequency ranges (8000<w<9000) and (9000<w<11000) may exceed the energy of LPF(L−R), which in this case has a zero (0) value. Thus, correlating LPFi(L−R) with Ls provides new information between the relationship (L−R) and Ls in different frequency ranges.

Thus, embodiments may function such that the relationship between a pair of audio channels comprises a time delay between the two channels of the pair, a filtering operation that was performed over a reference channel, which derives one or more of multiple channels in a multi-channel audio file, and/or a phase relationship between two channels. Time delay estimation may be based, at least partially, on correlation between at least two signals that each respectively includes a component of each of the two channels. The time delay relationship between two channels may thus be detected.

Detecting the filtering operation may involve estimating the reference channel for a first channel of the channel pair, filtering the estimated reference channel with multiple filters, and computing a correlation value between each of the filtered estimated reference channels and the first channel. Correlation between the two channels may be computed in relation to the time domain, the frequency domain, or the phase domain.

Feature extraction may be based on the computed correlation values between the filtered estimated reference channel and the first channel, in which a first set of features is derived based on the extracted features. Detecting the filtering operation detection may also involve estimating the reference channel for a first channel of the pair of channels and computing a correlation between each of the estimated reference channels and the first channel. Feature extraction may thus also be based on these correlation values between the estimated reference channel and the first channel, and a second feature set may thus be derived. A third set of features may be derived by comparing the first set of features with the second set of features.

The multiple filters that are applied over the estimated reference channels include at least one target filter. The target filter(s) applies a target filter function over the estimated reference channel that corresponds to the first processing function. The multiple filters that are applied over the estimated reference channels further include one or more second filters, which each has a characteristic that differs, at least partially, from a characteristic of the target filter.

The characteristic that differs between the target filter and the second filter(s) includes a cut-off frequency of the target filter in relation to a cutoff frequency of the second filter(s), a passband of the target filter in relation to a passband of the second filter(s), a transition band of the target filter in relation to a transition band of the second filter(s), and/or a stop band of the target filter in relation to a stop band of the second filter(s). The characteristic that differs between the target filter and the second filter(s) may also include a cut-off frequency, a passband, a transition band or a stop band of the target filter in relation to any frequency or band related characteristic of the second filter(s).

D. Example Blind Broadcast Upmixer Application.

Blind upmixers function somewhat differently than the upmixers described above, with reference for example to Dolby Prologic I and II™ upmixers. For example, as the name (familiar to artisans skilled in the relevant audio arts) suggests, blind upmixers create 5.1, 7.1 or more independent audio channels from a stereo file. As used herein, the term 'stereo file' includes, but is expressly not limited to a Lt/Rt downmix. Given any stereo file, blind upmixers compute a measure of inter-channel correlation between the input L0/Lt and R0/Rt channels. Blind upmixers control the amount of signal energy directed to the surround channels based on the measure of this correlation between the input L0/Lt and R0/Rt channels. Blind upmixers direct more signal energy to the surround channels when the measure of inter-channel correlation is small, and they direct less signal energy to the surround channels when the measure of inter-channel correlation is less. Blind upmixer applications of an embodiment are described below, with reference for example to Dolby [blind] Broadcast Upmixer.™ The reference to Dolby Broadcast Upmixer is by way of example and should not be construed as limiting in any way. On the contrary; embodiments of the present invention are well suited to function with any blind or broadcast upmixer.

Figure 8A:
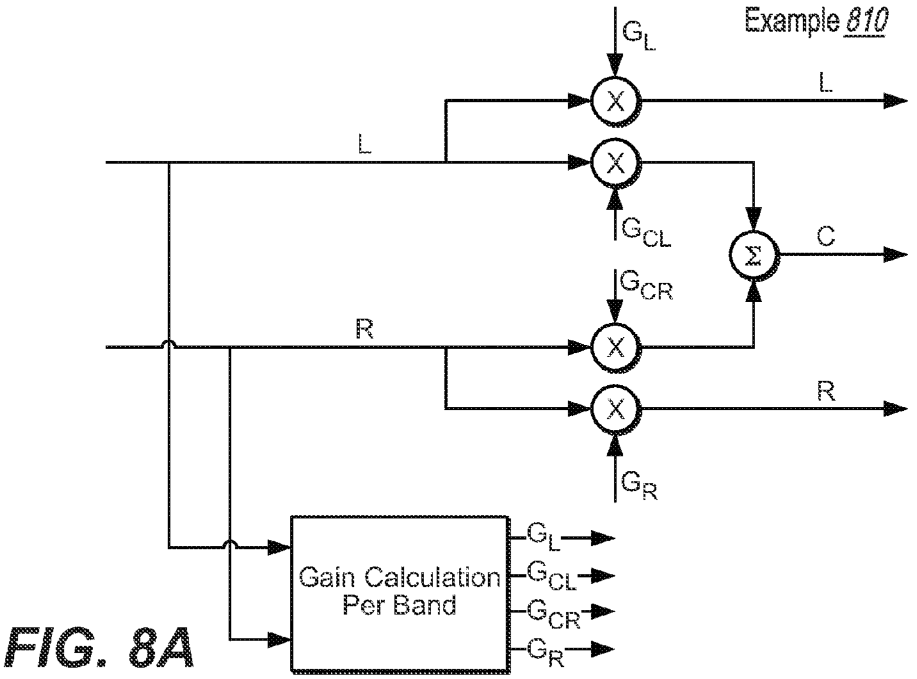
FIG. 8A and FIG. 8B respectively depict a schematic of broadcast upmixer front channel production and broadcast upmixer surround channel production, with which an embodiment of the present invention may function.

Dolby Broadcast Upmixer™ converts the two (2) stereo input channel signals into the frequency domain using a short time discrete Fourier transform (STDFT) and groups the signals into frequency bands. Each frequency band is processed independently from the other bands. FIG. 8A depicts a schematic of broadcast upmixer front channel production 810, with which an embodiment of the present invention may function. Broadcast upmixer front channel production 810 produces the three front channels L, C and R from the two input channels. The left signal is derived directly from the left input by applying gains ($G_L$) to each band. The right signal is derived directly from the right input by applying gains ($G_R$) to each band.

Figure 8B:
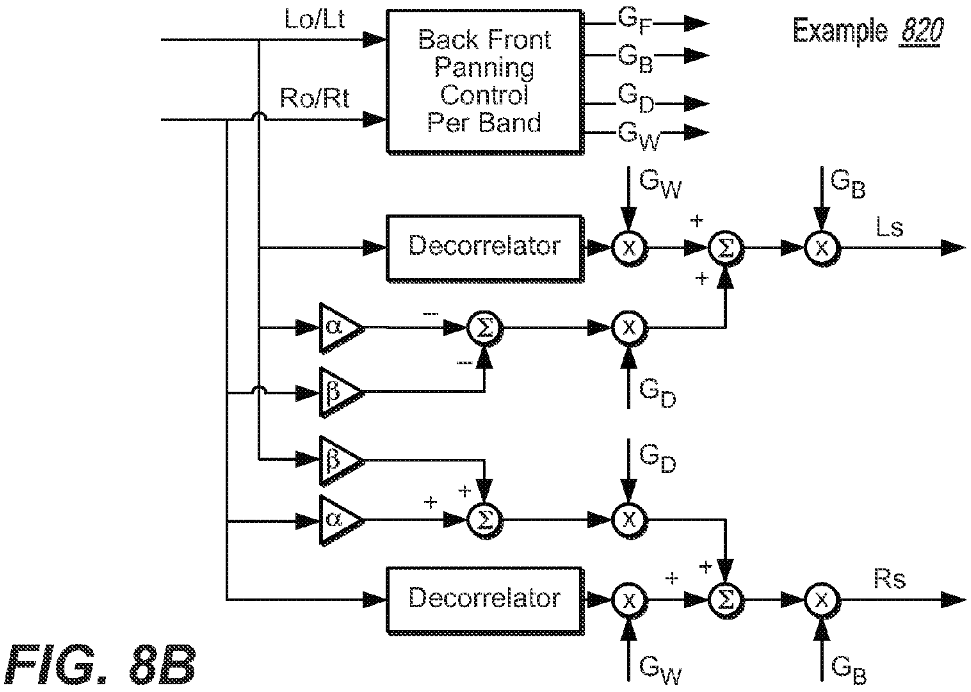

FIG. 8B depicts a schematic of broadcast upmixer surround channel production 820, with which an embodiment of the present invention may function. Broadcast upmixer surround channel production 820 generates the surround channels from matrix encoded content Lo/Lt and Ro/Rt. The left input signal undergoes decorrelation filtering to generate the left surround signal and the right input signal undergoes decorrelation filtering to generate the right surround signal. The decorrelation filter that filters the left and right input signals is used for improving the separation between front and surround channels. An embodiment functions to detect the specific decorrelation filter applied by the broadcast upmixer.

An impulse response of a decorrelating filter is specified as a finite length sinusoidal sequence whose instantaneous frequency decreases monotonically from $\pi$ to zero over the duration of the sequence, as shown in Equation 9, below.

$$h_i[n]G_i\sqrt{|\omega_i'(n)|}\cos(\phi_i(n))\ n=0\ldots L_i$$

$$\phi_i(t)=\int\omega_i(t)dt \tag{9}$$

In Equation 9, $\omega_i(t)$ represents the monotonically decreasing instantaneous frequency function, $\omega_i'(t)$ represents the first derivative of the instantaneous frequency, $\phi_i(t)$ represents the instantaneous phase given by the integral of the instantaneous frequency, and $L_i$ represents the length of the filter. The multiplicative term $\sqrt{|\omega_i'(t)|}$ approximately flattens the frequency response of $h_i[n]$ across all frequencies, and the gain $G_i$ is computed according to Equation 10, below.

$$\sum_{n=0}^{L_i} h_i^2[n] = 1. \tag{10}$$

The filter impulse response described in Equation 9 above has the form of a chirp-like sequence. Thus, filtering audio signals with such a filter can sometimes result in audible "chirping" artifacts at locations of transients. This effect may be reduced by adding a noise term to the instantaneous phase of the filter response, as described in Equation 11, below.

$$h_i[n]=G_i\sqrt{|\omega_i'(n)|}\cos(\phi_i(n)+N_i[n]) \tag{11}$$

Making the noise sequence $N_i[n]$ added in of Equation 10 equal to white Gaussian noise with a variance that is a small fraction of $\pi$ suffices to render the impulse response sound more noise-like than chirp-like, while the desired relation between frequency and delay, which is represented with $\omega_i(t)$ is still largely maintained. To compensate for a time delay that is introduced with the decorrelation filter, front channels may be delayed with an equal interval. Left and right surround channels may be further characterized with a phase difference between their decorrelation filters.

E. Example Detection Scheme for Broadcast Upmixer.

An embodiment detects specific decorrelation filters on the surround channels of audio to determine forensically whether a set of observed N channels of audio is a product of a broadcast upmixer. The left channel is produced with application of different gains to each frequency band of the input left signal. The left surround channel is produced with decorrelation of the input left signal and adding some gains to each frequency band thereof. The right channel is produced with application of different gains to each frequency band of the input right signal. The right surround channel is produced with decorrelation of the input right signal and adding some gains to each frequency band thereof. An embodiment may be implemented wherein a value of zero (0) is assumed for GD in FIG. 8B, and the direct contributions of left and right input signals to the surround channels are disregarded. In this implementation, both left and left surround channels become a direct product of the input left signal, as shown in Equation 12, below.

$$\text{Left}=G_L*\text{Delay}(L0/Lt);$$

$$\text{LeftSurround}=GB*GW*\text{DecorrelatorLeft}(L0/Lt) \quad (12)$$

An embodiment may be implemented wherein the left channel is decorrelated with the same decorrelation filter used in the production of the left surround channel, and wherein the left surround channel is delayed with the same duration as the delay imposed over the left signal, as described in Equation 13, below.

$$\text{Left}'=G_L*\text{DecorrelatorLeft}(\text{Delay}(L0/Lt));$$

$$\text{LeftSurround}'=G_B*G_W*\text{Delay}(\text{DecorrelatorLeft}(L0/Lt)) \quad (13)$$

The relative order with which the decorrelation filters and delay filters are applied over the audio is not particularly significant. Thus, an embodiment may be implemented wherein ρ(Left', LeftSurround') should have equal to one (1) in both the time domain and the phase domain. Likewise, for Right' and RightSurround' obtained without particular regard to the relative order with which the decorrelation filters and delay filters are applied over the audio, an embodiment may be implemented wherein the value of ρ(Right', RightSurround') should be equal to one (1). Thus, an embodiment functions with an assumption that the direct contribution of input left and right signals to the surrounds are negligible ($G_D \approx 0$) and may use time domain correlations between the front, and surround channels as features to be sought forensically:

(1) FB1=ρ(Left', LeftSurround'); and (2) FB2=ρ(Right', RightSurround').

An embodiment functions further to split the phase domain representation into frequency bands. Two of the lowest frequency bands are selected from which to extract phase domain features:

(3) FB3=ρ(θ(Left'(Band1)), θ(LeftSurround'(Band1)));

(4) FB4=ρ(θ(Left'(Band2)), θ(LeftSurround'(Band2)));

(5) FB5=ρ(θ(Right'(Band1), θ(RightSurround'(Band1))); and (6) FB6=ρ(θ(Right'(Band2), θ(RightSurround'(Band2))).

An embodiment uses these six (6) features for broadcast upmixer detection.

F. Example General Filter Detection Scheme.

Figure 9:
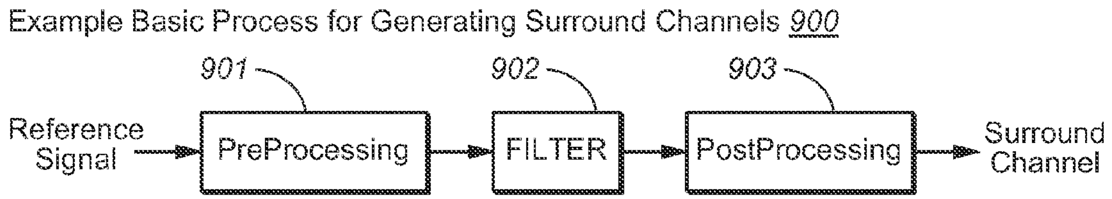
FIG. 9 depicts an example basic surround channels generation process, with which an embodiment of the present invention may function.

Filters are detected on the surround signals based, at least in part, on how the surround signals are generated. FIG. 9 depicts an example basic surround channels generation process 900, with which an embodiment of the present invention may function. The basic surround channels generation process 900 is described herein by way of example with reference to Dolby Prologic (I) and (II)™ decoders and the Dolby Broadcast Upmixer. The description refers to these particular decoders and upmixers by way of example, and should not be considered as limited thereto. On the contrary; embodiments are well suited to function with a variety of different decoders and upmixers.

A reference signal, from which the surround channel will be derived, is obtained (e.g., received, accessed). While Dolby Prologic (I) and (II)™ decoders use a reference signal that comprises a linear combination of input Lt and Rt signals, the Dolby Broadcast Upmixer™ uses a reference signal that comprises a left input for left surround and right input for right surround. The reference signal may undergo some preprocessing 901. For example, Dolby Prologic applies an anti-aliasing filter to pre-process 901 the reference signal. The pre-processed signal is filtered 902. For example, Dolby Prologic™ uses a 7 kHz low-pass Butterworth filter (e.g., FIG. 7A) or a shelf filter (e.g., FIG. 7B) and the Dolby Broadcast Upmixer™ uses a decorrelation filter, as described above. The filtered signal undergoes some post-processing 903 operations, such as gain applications used in the Dolby Broadcast Upmixer™. The surround signal is obtained (e.g., output) upon completion of the post-processing functions.

An example general framework for audio forensic tasks is described above, e.g., with reference to FIG. 1. To detect filters used in the processing history of an audio signal, an embodiment functions to extract features, according to that framework, as described with reference to FIG. 10.

Figure 10:
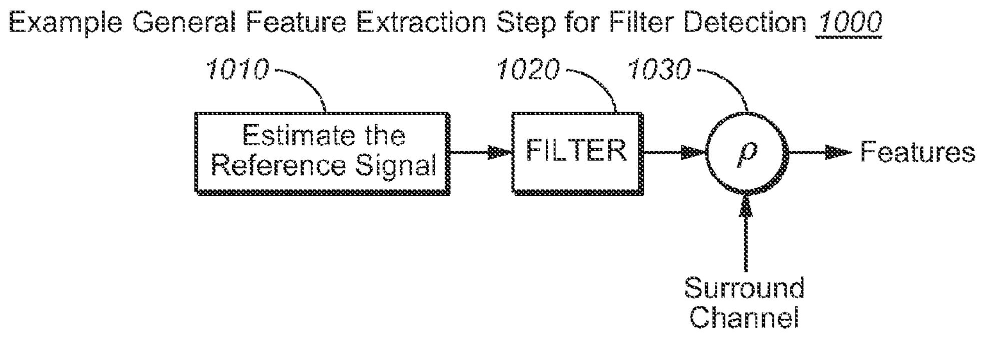
FIG. 10 depicts an example of feature extraction in relation to filter detection, according to an embodiment of the present invention.

FIG. 10 depicts an example of feature extraction 1000 in relation to filter detection, according to an embodiment of the present invention. In block 1010, a reference signal is estimated. For example, Dolby Broadcast Upmixer™ derives both left and left surround channels from the left input signal. Thus, the left input channel may be used as reference to implement the function of an example embodiment in the detection of information that relates to an operation of Broadcast Upmixer™ in a processing history. In detecting an operation of the Dolby Prologic™ decoder in a processing history, the (L−R) signal may be used as a reference, e.g., because all the channels are derived as a linear combination of input Lt and Rt signals. An embodiment functions to assume that preprocessing and postprocessing effects on the reference signal are negligible. For example, the application of different gains over each of the various frequency bands will not affect time domain correlation significantly.

In block 1020, the estimated reference signal is filtered. An embodiment filters the estimated reference signal using the same filter, which was used in producing the surround channel. An embodiment implementing forensic detection of Prologic decoder function uses a filterbank. In block 1030, the filtered reference estimate is correlated with the surround signal and the features sought are extracted. In the example implementations that relate to the Broadcast Upmixer detection, the correlation values are extracted and used directly as the features. In the example implementations that relate to the Prologic Upmixer detection, the differences in the correlation values are extracted and used as the features. The filter detection framework described herein can be used to detect any filter applied on the surround channels, with reliable reference signal estimation.

Thus, an embodiment functions to adaptively process a media signal based on the state of the media, in which the media state is determined by forensic analysis of features that are derived from the media. The derived features characterize a set of artifacts, which may be introduced by certain signal processing operations on media content, which essentially comprises a payload of the signal. The forensic features analysis of features thus comprises the conditional probability value computation relating to the extracted features under a statistical model. Information relating to a processing history, e.g., a record, evidence, or artifacts of processing operations that have been performed over the media content, comprise a component of, or characterize a state that may be associated with the media, e.g., a media state. The information relating to the media processing history may indicate whether certain signal processing operations were performed, such as volume leveling, compression, upmixing, spectral bandwidth extension and/or spatial virtualization, for example.

An embodiment obtains the statistical model with a training process, using an offline training set. The offline training set comprises both (1) example audio clips that undergone (e.g., been subjected to) certain processing operations, and (2) example audio clips that have not undergone those certain processing functions.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions, which relate to adaptive audio processing based on forensic detection of media processing history, such as are described herein. The computer and/or IC may compute, any of a variety of parameters or values that relate to the extending image and/or video dynamic range, e.g., as described herein. The adaptive audio processing based on forensic detection of media processing history embodiments may be implemented in hardware, software, firmware and various combinations thereof.

Figure 11:
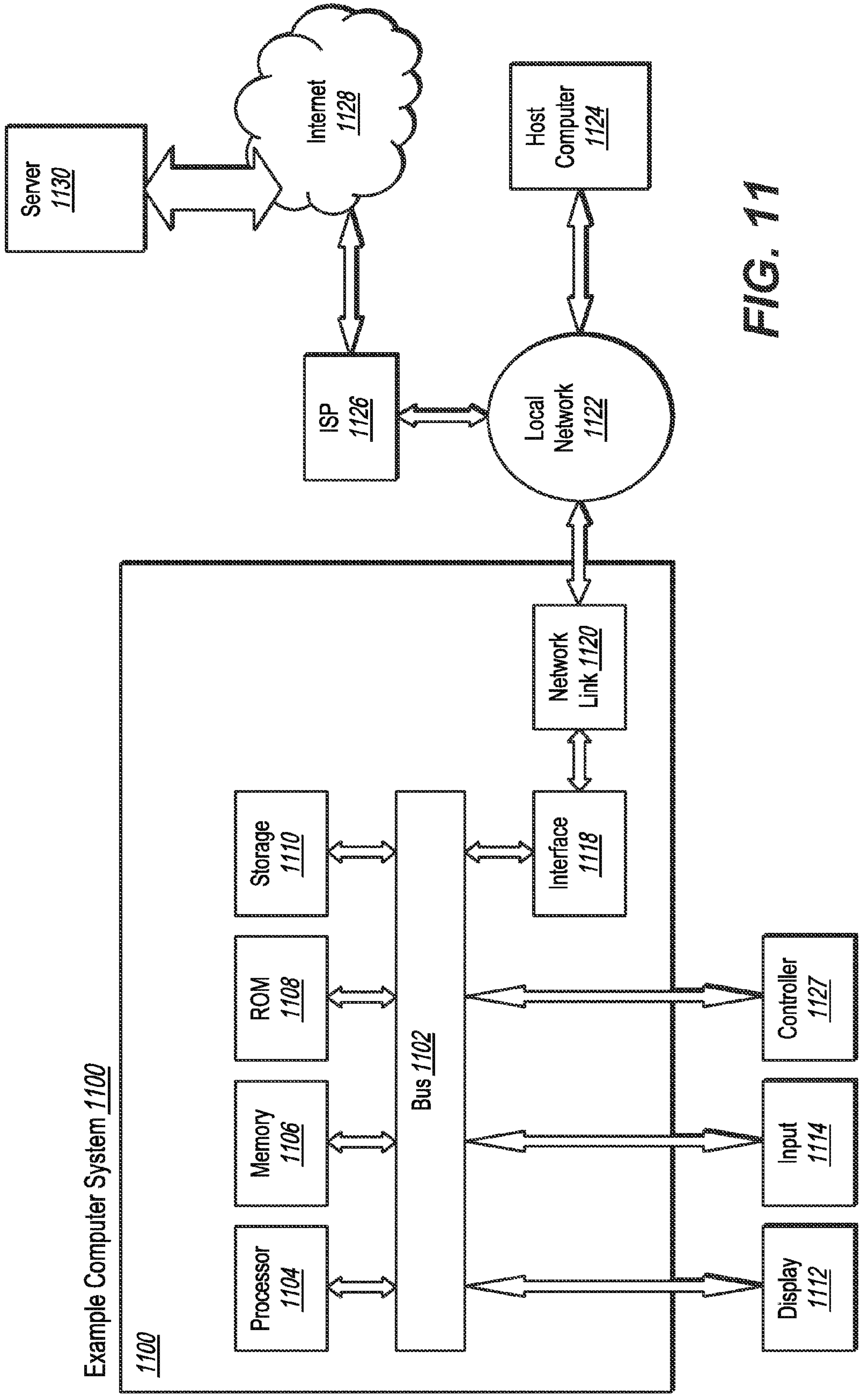
FIG. 11 depicts an example computer system platform, with which an embodiment of the present invention may be practiced.

FIG. 11 depicts an example computer system platform 1100, with which an embodiment of the present invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions. Processor 1104 may perform one or more digital signal processing (DSP) functions. Additionally or alternatively, DSP functions may be performed by another processor or entity (represented herein with processor 1104).

Computer system 1100 may be coupled via bus 1102 to a display 1112, such as a liquid crystal display (LCD), cathode ray tube (CRT), plasma display or the like, for displaying information to a computer user. LCDs may include HDR/VDR and/or WCG capable LCDs, such as with dual or N-modulation and/or back light units that include arrays of light emitting diodes. An input device 1114, including alphanumeric and other keys, is coupled to bus 1102 for communicating information and command selections to processor 1104. Another type of user input device is cursor control 1116, such as haptic-enabled "touch-screen" GUI displays or a mouse, a trackball, or cursor direction keys for communicating direction information and command selections to processor 1104 and for controlling cursor movement on display 1112. Such input devices typically have two degrees of freedom in two axes, a first axis (e.g., x) and a second axis (e.g., y), which allows the device to specify positions in a plane.

Embodiments of the invention relate to the use of computer system 1100 for adaptive audio processing based on forensic detection of media processing history. An embodiment of the present invention relates to the use of computer system 1100 to compute processing functions that relate to adaptive audio processing based on forensic detection of media processing history, as described herein. According to an embodiment of the invention, a media signal is accessed, which has been generated with one or more first processing operations. The media signal includes one or more sets of artifacts, which respectively result from the one or more processing operations. One or more features are extracted from the accessed media signal. The extracted features each respectively correspond to the one or more artifact sets. Based on the extracted features, a conditional probability is computed, which relates to the one or more first processing operations. This feature is provided, controlled, enabled or allowed with computer system 1100 functioning in response to processor 1104 executing one or more sequences of one or more instructions contained in main memory 1106.

Such instructions may be read into main memory 1106 from another computer-readable medium, such as storage device 1110. Execution of the sequences of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement the invention. Thus, embodiments of the invention are not limited to any specific combination of hardware, circuitry, firmware and/or software.

The terms "computer-readable medium" and/or "computer-readable storage medium" as used herein may refer to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and other conductors and fiber optics, including the wires that comprise bus 1102. Transmission media can also take the form of acoustic (e.g., sound, sonic, ultrasonic) or electromagnetic (e.g., light) waves, such as those generated during radio wave, microwave, infrared and other optical data communications that may operate at optical, ultraviolet and/or other frequencies.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a digital subscriber line (DSL), cable or other modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) (or telephone switching company) 1126. In an embodiment, local network 1122 may comprise a communication medium with which encoders and/or decoders function. ISP 1126 in turn provides data communication services through the worldwide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118.

In the Internet example, a server 1130 might transmit a requested code for an application program through Internet 1128, ISP 1126, local network 1122 and communication interface 1118. In an embodiment of the invention, one such downloaded application provides for adaptive audio processing based on forensic detection of media processing history, as described herein.

The received code may be executed by processor 1104 as it is received, and/or stored in storage device 1110, or other non-volatile storage for later execution. In this manner, computer system 1100 may obtain application code in the form of a carrier wave.

Example IC Device Platform

Figure 12:
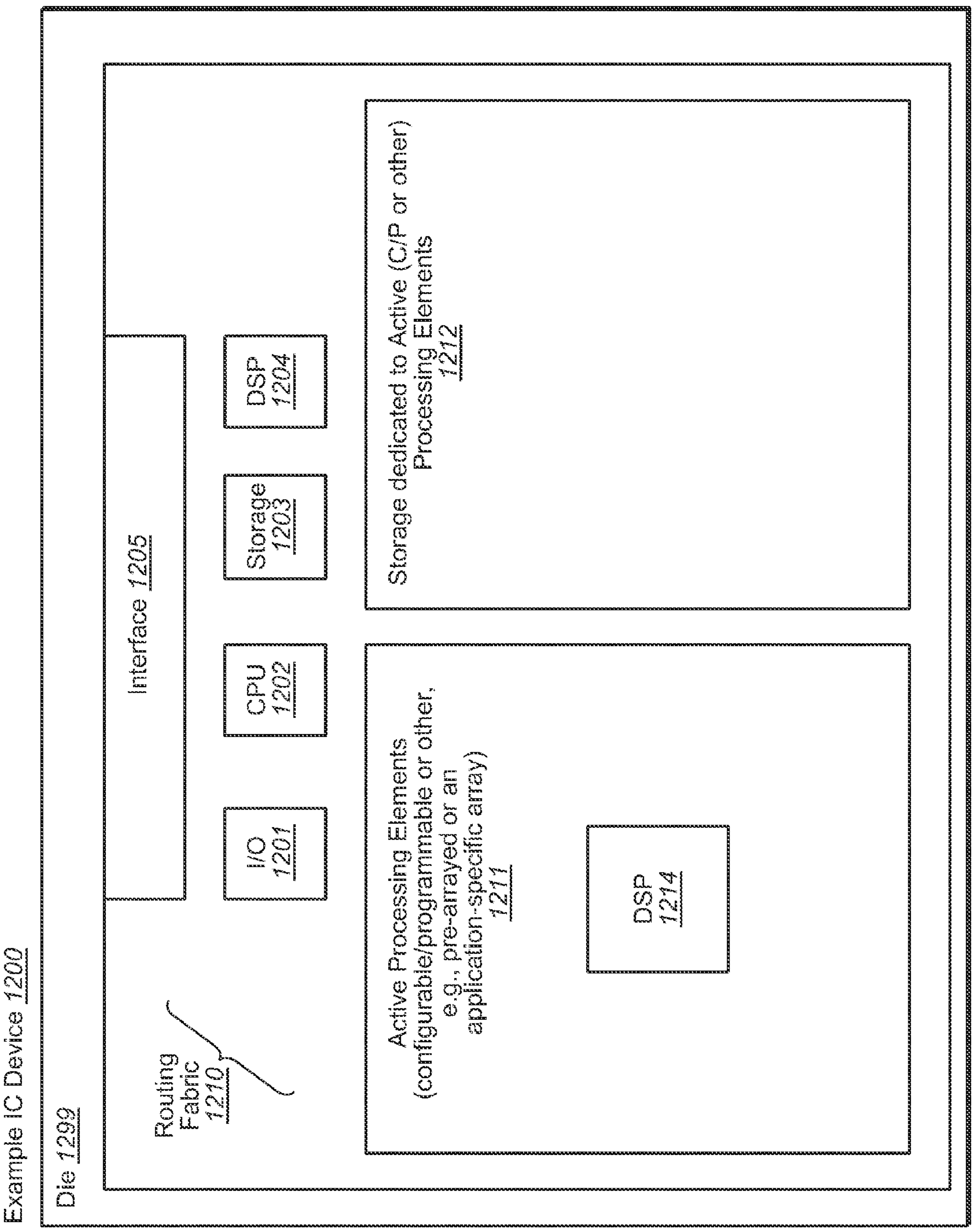
FIG. 12 depicts an example integrated circuit (IC) device, with which an embodiment of the present invention may be practiced.

FIG. 12 depicts an example IC device 1200, with which an embodiment of the present invention may be implemented for adaptive audio processing based on forensic detection of media processing history, as described herein. IC device 1200 may comprise a component of an encoder and/or decoder apparatus, in which the component functions in relation to the enhancements described herein. Additionally or alternatively, IC device 1200 may comprise a component of an entity, apparatus or system that is associated with display management, production facility, the Internet or a telephone network or another network with which the encoders and/or decoders functions, in which the component functions in relation to the enhancements described herein.

IC device 1200 may have an input/output (I/O) feature 1201. I/O feature 1201 receives input signals and routes them via routing fabric 1250 to a central processing unit (CPU) 1202, which functions with storage 1203. I/O feature 1201 also receives output signals from other component features of IC device 1200 and may control a part of the signal flow over routing fabric 1250. A digital signal processing (DSP) feature 1204 performs one or more functions relating to discrete time signal processing. An interface 1205 accesses external signals and routes them to I/O feature 1201, and allows IC device 1200 to export output signals. Routing fabric 1250 routes signals and power between the various component features of IC device 1200.

Active elements 1211 may comprise configurable and/or programmable processing elements (CPPE) 1215, such as arrays of logic gates that may perform dedicated or more generalized functions of IC device 1200, which in an embodiment may relate to adaptive audio processing based on forensic detection of media processing history. Additionally or alternatively, active elements 1211 may comprise pre-arrayed (e.g., especially designed, arrayed, laid-out, photolithographically etched and/or electrically or electronically interconnected and gated) field effect transistors (FETs) or bipolar logic devices, e.g., wherein IC device 1200 comprises an ASIC. Storage 1202 dedicates sufficient memory cells for CPPE (or other active elements) 1201 to function efficiently. CPPE (or other active elements) 1215 may include one or more dedicated DSP features 1225.

EQUIVALENTS, EXTENSIONS, ALTERNATIVES AND MISCELLANEOUS

Example embodiments that relate to adaptive audio processing based on forensic detection of media processing history are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising the steps of: accessing a media signal that is generated with one or more first processing operations that occurred prior to the media signal access to change at least one characteristic of the media signal and generate one or more sets of artifacts comprising unintended traces of the one or more first processing operations on the media signal and characterize, at least in part, a processing history of the media signal prior to the accessing;

extracting one or more features from the accessed media signal, wherein the extracted features each respectively correspond to the one or more sets of artifacts;

computing from the extracted features a conditional probability value relating a probability of observing the extracted features given the one or more first processing operations; and if the conditional probability value is above a defined threshold, adapting one or more second processing operations respectively corresponding to each of the one or more first processing operations such that each of the one or more second processing operations economizes computational resources and prevents formation of further artifacts.

2. The method as recited in claim 1, wherein the one or more first processing operations define a state of the media signal based on the processing history, and wherein the one or more features are determined by one of metadata and hidden data comprising part of the media signal.

3. The method as recited in claim 1 wherein the second processing operation occurs subsequent to the first processing operation in relation to the media signal processing history.

4. The method as recited in claim 1 wherein the second processing operation occurs prior to the first processing operation in relation to the media signal processing history, and wherein the adapting operation is provided to the first operation to provided feedback to the first operation.

5. The method as recited in claim 1 wherein the conditional probability value is computed by a statistical learning process that maximizes a probability function that maps a selected subset of features to a labeled set of the one or more features.

6. The method as recited in claim 5 further comprising generating the labeled set of features by assigning a binary value to indicate whether each feature of the one or more features is a positive example or a negative example, wherein a negative example comprises at least a portion of the media signal that did not undergo the one or more first processing operations, and wherein a positive example comprises at least a portion of the media signal that did undergo the one or more first processing operations.

7. The method as recited in claim 1 wherein each of the one or more second processing operations corresponds to each respective first processing operation by one of identical operation, substantially similar operation, and independent operation.

8. The method as recited in claim 1 wherein the adaptation of the second processing operation comprises one or more of restraining, constraining, deterring, modifying, controlling or delaying at least one function, feature or characteristic of the second processing operations and further wherein the artifacts and further artifacts are unwanted artifacts, and wherein the adapting operation operates to minimize the unwanted artifacts.

9. The method as recited in claim 1 wherein the one or more first processing operations comprise one or more of:

a perceptual audio coding function;

a dynamic range compression function;

an upmixing function;

a spectral bandwidth extension function; or a spatial virtualization function.

10. A computer apparatus, comprising: a bus; at least one processor coupled to the bus; and a computer readable storage medium coupled to the bus, the computer readable storage medium comprising instructions, which when executed with the at least one processor, cause, control, program or configure the at least one processor to perform a process, the process comprising:

accessing a media signal that is generated with one or more first processing operations that occurred prior to the media signal access to change at least one characteristic of the media signal and generate one or more sets of artifacts comprising unintended traces of the one or more first processing operations on the media signal and characterize, at least in part, a processing history of the media signal prior to the accessing;

extracting one or more features from the accessed media signal, wherein the extracted features each respectively correspond to the one or more sets of artifacts;

computing from the extracted features a conditional probability value relating a probability of observing the extracted features given the one or more first processing operations; and if the conditional probability value is above a defined threshold, adapting one or more second processing operations respectively corresponding to each of the one or more first processing operations such that each of the one or more second processing operations economizes computational resources and prevents formation of further artifacts.

11. An audio system or apparatus, comprising: one or more processor; and a computer readable storage medium that comprises instructions, which when executed with the one or more processors, cause, control, program or configure the one or more processors to perform a process, the process comprising: accessing a media signal that is generated with one or more first processing operations that occurred prior to the media signal access to change at least one characteristic of the media signal and generate one or more sets of artifacts comprising unintended traces of the one or more first processing operations on the media signal and characterize, at least in part, a processing history of the media signal prior to the accessing; extracting one or more features from the accessed media signal, wherein the extracted features each respectively correspond to the one or more sets of artifacts;

To change at least one characteristic of the media signal and that generate one or more sets of artifacts comprising unintended traces of the one or more first processing operations on the media signal and characterize, at least in part, a processing history of the media signal prior to the accessing step; extracting one or more features from the accessed media signal, wherein the extracted features each respectively correspond to the one or more sets of artifacts; and based on the extracted features, computing a score that comprises at least one of a heuristically based score or a conditional probability score, wherein the score relates to the one or more first processing operations; and adapting a second processing operation based on the computed score computing from the extracted features a conditional probability value relating a probability of observing the extracted features given the one or more first processing operations; and if the conditional probability value is above a defined threshold, adapting one or more second processing operations respectively corresponding to each of the one or more first processing operations such that each of the one or more second processing operations economizes computational resources and prevents formation of further artifacts.

* * * * *